United States Patent
Kadatch et al.

(10) Patent No.: US 9,250,830 B2
(45) Date of Patent: Feb. 2, 2016

(54) STORING DATA ACROSS A PLURALITY OF STORAGE NODES

(71) Applicant: Google Inc., Mountain View, CA (US)

(72) Inventors: Andrew Kadatch, Redmond, WA (US); Lawrence E. Greenfield, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/293,330

(22) Filed: Jun. 2, 2014

(65) Prior Publication Data

US 2014/0281233 A1 Sep. 18, 2014

Related U.S. Application Data

(63) Continuation of application No. 13/010,548, filed on Jan. 20, 2011, now Pat. No. 8,745,329.

(51) Int. Cl.
*G06F 12/08* (2006.01)
*G06F 3/06* (2006.01)
*G06F 11/10* (2006.01)

(52) U.S. Cl.
CPC .............. *G06F 3/067* (2013.01); *G06F 3/0613* (2013.01); *G06F 3/0656* (2013.01); *G06F 11/1044* (2013.01); *G06F 11/1076* (2013.01); *G06F 2003/0691* (2013.01); *G06F 2211/1009* (2013.01); *G06F 2211/1028* (2013.01)

(58) Field of Classification Search
CPC ..... G06F 3/0613; G06F 3/0656; G06F 3/067; G06F 12/0866; G06F 11/1044; G06F 11/1076; G06F 2003/0691; G06F 2211/1028; G06F 2211/1009

See application file for complete search history.

(56) References Cited

U.S. PATENT DOCUMENTS

| | | | |
|---|---|---|---|
| 5,463,768 A | 10/1995 | Cudihy et al. | |
| 5,778,444 A | 7/1998 | Langan et al. | |
| 6,148,368 A * | 11/2000 | DeKoning | 711/113 |
| 6,178,482 B1 | 1/2001 | Sollars | |
| 6,449,671 B1 * | 9/2002 | Patkar et al. | 711/E12.023 |
| 6,598,179 B1 | 7/2003 | Chirashnya et al. | |
| 6,829,678 B1 * | 12/2004 | Sawdon et al. | 711/114 |
| 7,062,718 B2 | 6/2006 | Kodosky et al. | |
| 7,117,243 B2 | 10/2006 | Peart | |
| 7,650,331 B1 | 1/2010 | Dean et al. | |
| 7,653,833 B1 | 1/2010 | Miller et al. | |

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Michael Krofcheck
(74) *Attorney, Agent, or Firm* — Fish & Richardson P.C.

(57) ABSTRACT

Methods, systems, and apparatus, including computer programs encoded on a computer storage medium, for storing data on storage nodes. In one aspect, a method includes receiving a file to be stored across a plurality of storage nodes each including a cache. The is stored by storing portions of the file each on a different storage node. A first portion is written to a first storage node's cache until determining that the first storage node's cache is full. A different second storage node is selected in response to determining that the first storage node's cache is full. For each portion of the file, a location of the portion is recorded, the location indicating at least a storage node storing the portion.

18 Claims, 5 Drawing Sheets

(56) References Cited

U.S. PATENT DOCUMENTS

| | | | |
|---|---|---|---|
| 7,761,573 | B2 | 7/2010 | Travostino et al. |
| 7,804,862 | B1 | 9/2010 | Olson et al. |
| 8,146,147 | B2 | 3/2012 | Litvin et al. |
| 8,261,295 | B1 | 9/2012 | Risbood et al. |
| 8,276,140 | B1 | 9/2012 | Beda et al. |
| 8,533,796 | B1 | 9/2013 | Shenoy et al. |
| 8,677,449 | B1 | 3/2014 | Beda |
| 8,745,329 | B2 | 6/2014 | Kadatch et al. |
| 8,800,009 | B1 | 8/2014 | Beda et al. |
| 8,812,586 | B1 | 8/2014 | Kulkarni et al. |
| 8,813,240 | B1 | 8/2014 | Northup |
| 8,874,888 | B1 | 10/2014 | Beda, III et al. |
| 8,909,939 | B1 | 12/2014 | Beda et al. |
| 2002/0091902 | A1 | 7/2002 | Hirofuji |
| 2004/0139368 | A1 | 7/2004 | Austen et al. |
| 2004/0148484 | A1* | 7/2004 | Watanabe et al. ............. 711/170 |
| 2005/0166011 | A1 | 7/2005 | Burnett et al. |
| 2005/0216659 | A1* | 9/2005 | Ogawa et al. ................. 711/113 |
| 2006/0026354 | A1* | 2/2006 | Lesot et al. ................... 711/118 |
| 2006/0161753 | A1 | 7/2006 | Aschoff et al. |
| 2006/0271547 | A1* | 11/2006 | Chen et al. ....................... 707/10 |
| 2007/0011361 | A1* | 1/2007 | Okada et al. ...................... 710/8 |
| 2007/0118694 | A1 | 5/2007 | Watanabe et al. |
| 2007/0199058 | A1 | 8/2007 | Baumgart et al. |
| 2007/0271604 | A1 | 11/2007 | Webster et al. |
| 2007/0280243 | A1 | 12/2007 | Wray et al. |
| 2007/0288921 | A1 | 12/2007 | King et al. |
| 2008/0071983 | A1* | 3/2008 | Kamei et al. .................. 711/113 |
| 2008/0086515 | A1 | 4/2008 | Bai et al. |
| 2008/0205415 | A1 | 8/2008 | Morales |
| 2008/0215796 | A1 | 9/2008 | Lam et al. |
| 2008/0244030 | A1* | 10/2008 | Leitheiser ..................... 709/211 |
| 2008/0270704 | A1 | 10/2008 | He et al. |
| 2008/0313241 | A1* | 12/2008 | Li et al. ......................... 707/202 |
| 2009/0097657 | A1 | 4/2009 | Schiedt et al. |
| 2009/0150629 | A1 | 6/2009 | Noguchi et al. |
| 2009/0199177 | A1 | 8/2009 | Edwards et al. |
| 2009/0222815 | A1 | 9/2009 | Dake |
| 2009/0241108 | A1 | 9/2009 | Edwards et al. |
| 2009/0249440 | A1 | 10/2009 | Platt et al. |
| 2009/0300605 | A1 | 12/2009 | Edwards et al. |
| 2010/0057913 | A1 | 3/2010 | DeHaan |
| 2010/0071035 | A1 | 3/2010 | Budko et al. |
| 2010/0088335 | A1* | 4/2010 | Mimatsu ....................... 707/770 |
| 2010/0199089 | A1 | 8/2010 | Vysogorets et al. |
| 2010/0274984 | A1* | 10/2010 | Inomata et al. ............... 711/162 |
| 2010/0287548 | A1 | 11/2010 | Zhou et al. |
| 2011/0022812 | A1 | 1/2011 | van der Linden et al. |
| 2011/0055361 | A1 | 3/2011 | DeHaan |
| 2011/0085563 | A1 | 4/2011 | Kotha et al. |
| 2011/0103389 | A1 | 5/2011 | Kidambi et al. |
| 2011/0153838 | A1 | 6/2011 | Belkine et al. |
| 2011/0191485 | A1 | 8/2011 | Umbehocker |
| 2011/0231280 | A1 | 9/2011 | Farah |
| 2011/0258441 | A1 | 10/2011 | Ashok et al. |
| 2012/0185688 | A1 | 7/2012 | Thornton |
| 2012/0266159 | A1 | 10/2012 | Risbood et al. |
| 2013/0081014 | A1 | 3/2013 | Kadatch et al. |

OTHER PUBLICATIONS

Primet, Pascale, et al.., "HIPCAL: State of the Art of OS and Network virtualization solutions for Grids", Sep. 14, 2007, 38 pages.
Wikipedia, "IPSec", [online] [retrieved on Nov. 4, 2011]. Retrieved from the Internet: <URL: http://en.wikipedia.org/wiki/IPsec/>, 8 pages.
Abdull, AlastairIrvine, et al. "Generic Routing Encapsulation", [online] [retrieved on Nov. 4, 2011]. Retrieved from the Internet: <URL: http://creativecommons.org/licenses/by-sa/3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth> , 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).

(56) References Cited

OTHER PUBLICATIONS

Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios—Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online] "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online] Creative Commons Attribution-Share Alike 3.0 Unported. [retrieved on Jan. 14, 2011]. Retrieved from the Internet:<URL: http://creativecommons.org/licenses/by-sa/3.0/ >pp. 1-8.
"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
L. Gommans, et al., Token-Based Authorization of Connection Oriented Network Resources, 1st International Workshop on Networks for Grid Applications (GridNets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.

* cited by examiner

STORING DATA ACROSS A PLURALITY OF STORAGE NODES

CROSS-REFERENCE TO RELATED APPLICATIONS

This application is a continuation of U.S. patent application Ser. No. 13/010,548, filed on Jan. 20, 2011, entitled "Storing Data Across A Plurality Of Storage Nodes," the disclosure of which is considered part of and in incorporated herein by reference.

BACKGROUND

This specification relates to storing digital data on physical storage devices.

Data striping involves storing data across an array of storage devices. Rather than writing all the data to a single device, the data is written in parallel to multiple devices so that the overall rate of data being written is greater than is possible with only a single device. Data striping can be combined with other data storage techniques, for example, storing redundant data, error-detecting, or error-correcting codes with the data to create fast, reliable storage.

SUMMARY

A computer storage system stores a file on an array of storage nodes. Each storage node includes one or more storage devices, and each storage node includes a cache (e.g., Random Access Memory (RAM)) and slower storage (e.g., a hard disk.) The cache can store data faster than the slower storage. For example, a storage node can be a hard disk with caching capabilities. The computer storage system writes data from the file to a first storage node until the first storage node's cache is full and then writes data from the file to a second storage node. The first storage node copies the data from the first storage node's cache to the first storage node's slower storage. The computer storage system continues writing data to various storage devices so that the file is completely stored. Data written to storage nodes can be written in the same manner regardless of whether the storage nodes are attached to, e.g., an individual computer or multiple data processing apparatus.

In general, one innovative aspect of the subject matter described in this specification can be embodied in methods that include the actions of receiving a file to be stored across a plurality of storage nodes each including a cache; storing the file by storing a plurality of portions of the file each on a different storage node, including writing a first portion to a first storage node's cache until determining that the first storage node's cache is full and selecting a different second storage node in response to determining that the first storage node's cache is full; and recording, for each portion of the file, a location of the portion, the location indicating at least a storage node storing the portion. Other embodiments of this aspect include corresponding systems, apparatus, and computer programs, configured to perform the actions of the methods, encoded on computer storage devices.

These and other embodiments can optionally include one or more of the following features. Determining that the first storage node's cache is full comprises determining that a data storage rate for writing the first portion has dropped. Determining that the first storage node's cache is full comprises comparing an amount of the first portion to a known size of the first storage node's cache and determining that the amount is equal to or exceeds the known size. Selecting the second storage node comprises selecting the second storage node randomly from the storage nodes. Selecting the second storage node comprises selecting a storage node having a write time furthest in the past. The actions further include assigning a weight to each of the plurality of storage nodes, and wherein selecting the second storage node includes using the weights. Each storage node's weight is based on a performance characteristic of the storage node. Selecting the second storage node is based on one or more of: a performance characteristic of the second storage node, usage history of the second storage node, and a past performance record for the second storage node. Selecting the second storage node is based on one or more of: an absolute amount of data stored by the second storage node, and an amount of data stored by the second storage node relative to a capacity of the second storage node. The first storage node copies the first portion from the first storage node's cache to slower storage in response to writing the first portion to the first storage node's cache. Storing the file comprises writing a second portion to the second storage node. Writing the second portion to the second storage node comprises writing the second portion to the second storage node's cache until determining that second storage node's cache is full. Storing the file comprises continuing to write portions of the file to various storage nodes until the file is completely stored in the storage nodes. The actions further include receiving a request for the file; reading the first portion from the first storage node; and reading the second portion from the second storage node.

Particular embodiments of the subject matter described in this specification can be implemented so as to realize one or more of the following advantages. A computer storage system can increase its storage speed by writing to storage nodes with caches. The storage nodes are kept in a cached mode more frequently to decrease latency and increase throughput. The computer storage system can recover the stored data using a storage log.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
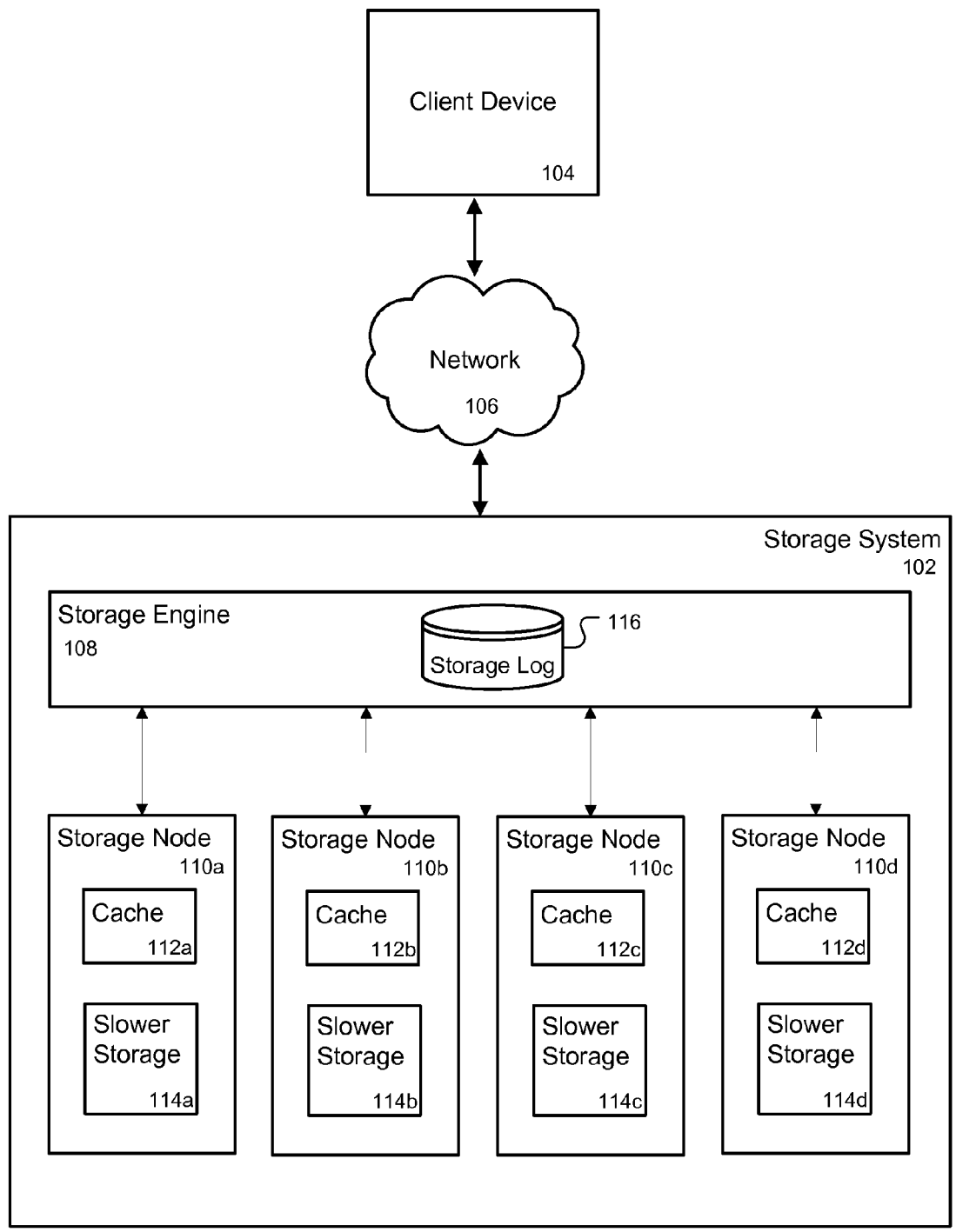
FIG. 1 is a block diagram of an example storage system.

FIG. 1 is a block diagram of an example storage system 102. The storage system 102 includes one or more data processing apparatus that can be distributed geographically. The storage system 102 stores files of digital data on an array of storage nodes 110a-d. The storage system 102 can receive an electronic file (or "file") from a client device 104 over a computer network 106 or from another source. A file can be any data, for example, text, an image, audio content, video content, or combinations thereof. A file can be received by the storage system 102 as through a network file system protocol, for example. Other protocols are possible. The storage system 102 can create data for storage, e.g., by producing service logs during normal operation. The storage system 102 can create data for storage based on other data, e.g., by producing a small thumbnail image from a high-resolution source image. A storage engine 108 determines how to distribute a file's contents for storage on the storage nodes 110a-d.

Each storage node 110 includes a cache 112 and one or more slower storage 114 devices. The cache 112 can be, for example, RAM, flash memory, a hard disk, or the like. The slower storage 114 can also be RAM or a hard disk, but the slower storage 114 takes longer to store data than the cache 112. The slower storage 114 typically has greater storage capacity than the cache 112. Data written to a storage node 110 is first written to the cache 112 because data can be stored in the cache 112 faster than the slower storage 114. The storage node 110 then copies the data from the cache 112 to the slower storage 114.

For example, a storage node 110 can be a hard disk with a RAM cache. Data written to the storage node 110 is first written to the RAM cache and then copied to the disk. In another example, a storage node 110 is an array of hard disks with a shared RAM cache, e.g., a Redundant Array of Inexpensive Disks (RAID) device. Although the storage node 110 includes multiple disks, the storage engine 108 can logically address the storage node as a single device.

The storage engine 108 stores a file by writing a portion of data from the file to a storage node. The storage engine 108 writes data to that storage node until determining that the storage node's cache is full. A cache is full when it is storing an amount of data at or near its capacity so that it can no longer accept new data for storage. Techniques for determining that a cache is full are described below. The storage engine 108 then writes another portion of data from the file to a different storage node until determining that the different storage node's cache is full. The portions written by the storage engine 108 are not necessarily adjacent in the file, and the file's contents do not have to be written in order.

The storage engine 108 continues to write data from the file on various storage nodes until the file's contents are completely written. Alternatively, less than the entire file's content is written. If all of the storage nodes have full caches, the storage engine 108 can wait until a cache has free space (after copying its contents to slower storage) or write directly to slower storage. In some implementations, the storage engine 108 continues selecting new storage nodes to write to until it finds one that is available, regardless of whether or not all of the storage nodes have full caches. By writing to storage nodes with available cache storage, the storage engine 108 increases its rate of data storage compared to writing a single file to a single device regardless of whether the cache is full or not.

The storage engine 108 tracks the location of written data from the file in a storage log 116. The storage log 116 includes information necessary to recover the file from the storage nodes. For example, the storage log 116 can include the location of data on the first storage node. The storage log 116 also includes an association between the location and the file (e.g., by including the location and the file name in a same record or row of a table). An example storage log is illustrated below in Table 1.

TABLE 1

| Filename | Storage Node | Addresses | Timestamp |
|---|---|---|---|
| File 1 | A | 1-50 | 1 |
| | B | 200-300 | 2 |
| | C | 50-125 | 3 |
| File 2 | A | 150-250 | 4 |
| | C | 200-300 | 5 |

For example, consider an example scenario for storing "File 1" as illustrated by Table 1. The first three rows are associated with File 1 by the first column. The first row indicates that at the time given by timestamp 1, the storage engine 108 wrote data from File 1 to addresses 1-50 of storage node A. The second row indicates that at the time given by timestamp 2, the storage engine 108 wrote data from File 1 to addresses 200-300 of storage node B. The storage engine 108 used more addresses at storage node B than storage node A, for example, because storage node B has a larger cache than storage node A, or because storage node A's cache was partially full when the storage engine 108 began writing data. The third row indicates that at the time given by timestamp 3, the storage engine 108 wrote data from File 1 to addresses 50-125 of storage node C.

The addresses illustrated by Table 1 are example addresses. In general, the addresses refer to locations of data on slower storage at a storage node. Even though data is typically initially written to a cache, the addresses refer to locations on slower storage because the storage node copies data from the cache to slower storage. For example, a storage node can map the location of data written to its cache to a destination location on slower storage.

The storage engine 108 can determine that a storage node's cache is full using various techniques. For example, the storage engine 108 can monitor the rate at which a storage node is accepting data. When the rate drops, the storage engine 108 determines that the storage node's cache is full. In another example, the storage engine 108 can compare the amount of data it has written to a storage node to a specified size of the storage node's cache. When the amount of data written exceeds the specified size, the storage engine 108 determines that the storage node's cache is full. The storage engine 108 can store specified sizes for the storage nodes, or the storage engine 108 can query a storage node for a specified size before it begins writing to the storage node. In some implementations, no determination is needed because the storage engine 108 writes only the amount of a specified size to a storage node and then selects a different storage node. Those implementations are useful, for example, where there is enough cache storage to assume that each cache will be empty when selected again.

When the storage engine 108 determines that a storage node's cache is full, it can select a different storage node using various techniques. Consider the following four example techniques.

In a first example, the storage engine 108 can randomly select another storage node. This is useful, for example, where multiple storage engines are writing to the various storage nodes and it is difficult to determine whether any given storage node will have available cache storage.

In a second example, the storage engine 108 can use the storage log 116 to select a different storage node. The storage engine 108 typically selects a storage node having a write time furthest in the past of any storage node. For example, consider the example storage log illustrated in Table 1. Of storage nodes A, B, and C, storage node B was has a write time furthest in the past (at timestamp 2).

In a third example, the storage engine 108 can use weighted randomization. Weighted randomization involves assigning weights to storage nodes and selecting storage nodes based on the weights. For example, suppose all the storage nodes belong to one of two classes, A and B. The nodes belonging to class B are, on average, two times faster than nodes belonging to class A (e.g., because nodes belonging to class B use newer hardware). The storage engine 108 can select nodes from class B more frequently than nodes from class A to improve system performance. In some implementations, weights W[k] are assigned to individual storage nodes, and the storage engine 108 selects storage nodes so that the likelihood of choosing a node #k is proportional to $$\frac{W[k]}{\sum_i W[i]}.$$

In a fourth example, storage engine 108 can select nodes in a pseudo-random manner. The likelihood of a node being chosen is based on various factors related to the node, e.g., performance characteristics (e.g., cache speed), usage history (e.g., using the storage log 116), past performance records (e.g., avoiding a node that consistently or temporarily is slower than other nodes).

The storage engine 108 can use other information in selecting a different storage node. The storage engine 108 can select storage nodes according to a plan or scheme for storage. For example, the storage engine 108 can use the absolute amount of data already stored by a storage node, the amount of data stored by a storage node relative to its capacity (e.g., to prevent writing or attempting to write to node that is full), the age of data (e.g., where new data is accessed more frequently than old data), and so on. The storage engine 108 can use a storage node's load and capacity, for example, to facilitate uniform storage utilization across all available storages and avoid having all the data stored on very few nodes.

Figure 2:
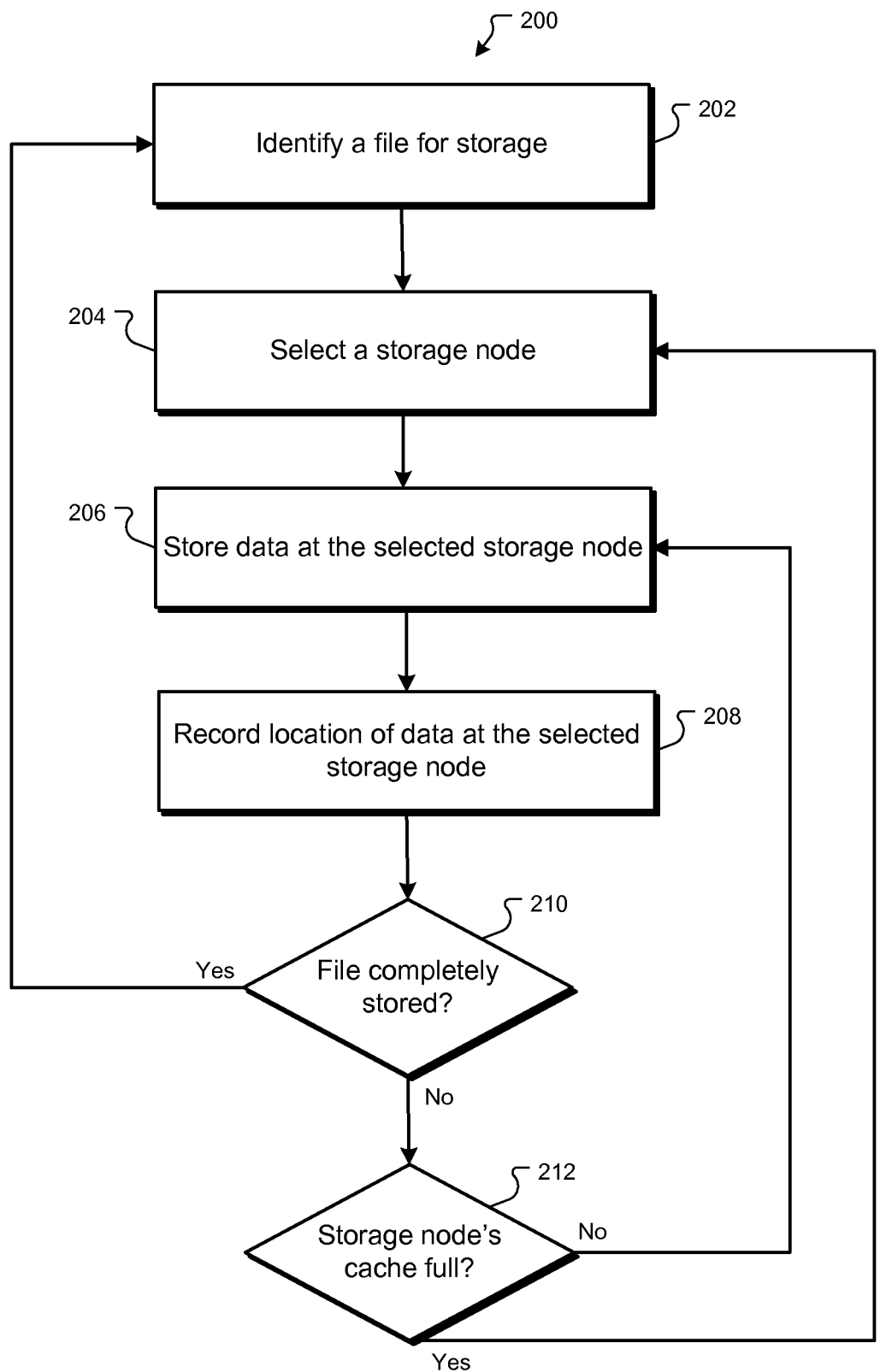
FIG. 2 is a flow diagram of an example technique for storing data on an array of storage nodes each having a cache.

In another example, the storage engine 108 can balance speed and latency of writing data against data processing capacity, e.g., by monitoring data access patterns, current or projected. This is useful, for example, to avoid storing a large amount of high-demand data on a single storage node or just a few storage nodes. The storage engine 108 can identify high-demand data, for example, using past data access patterns of the specific data, or using other information about the data, e.g., whether it is freshly generated. FIG. 2 is a flow diagram of an example technique 200 for storing data on an array of storage nodes each having a cache. The technique 200 can be performed by a computer system, e.g., the computer system 102 of FIG. 1. For purposes of illustration, the technique 200 will be described with respect to a system that performs the technique.

The system identifies a file for storage on the storage nodes (step 202). For example, the system can receive a file from a client device, e.g., the client device 104 of FIG. 1.

The system selects a storage node (step 204). For example, the system can randomly select a storage node, or the system can select a storage node using a storage log, e.g., the storage log 116 of FIG. 1.

The system stores data from the file at the selected storage node (step 206). For example, the system can send a fixed amount of data to the selected storage node, or the system can stream data for a fixed amount of time.

The system records the location of the stored data at the selected storage node (step 208). For example, the system can record the location in a storage log, e.g., the storage log 116 of FIG. 1. The system associates the location of the stored data with the file (e.g., using a file name or file descriptor).

The system determines whether the file is completely stored (step 210). If the file is stored, then the system identifies another file (return to step 202). If the file is not stored, then the system determines whether the selected storage node's cache is full (step 212). For example, the system can monitor the data rate of the write to the storage node, or compare a specified size of the storage node to the amount of data written.

If the selected storage node's cache is full, then the system selects another storage node (return to step 204). If the selected storage node's cache is not full, then the system continues writing data from the file to the selected storage node (return to step 206).

Figure 3:
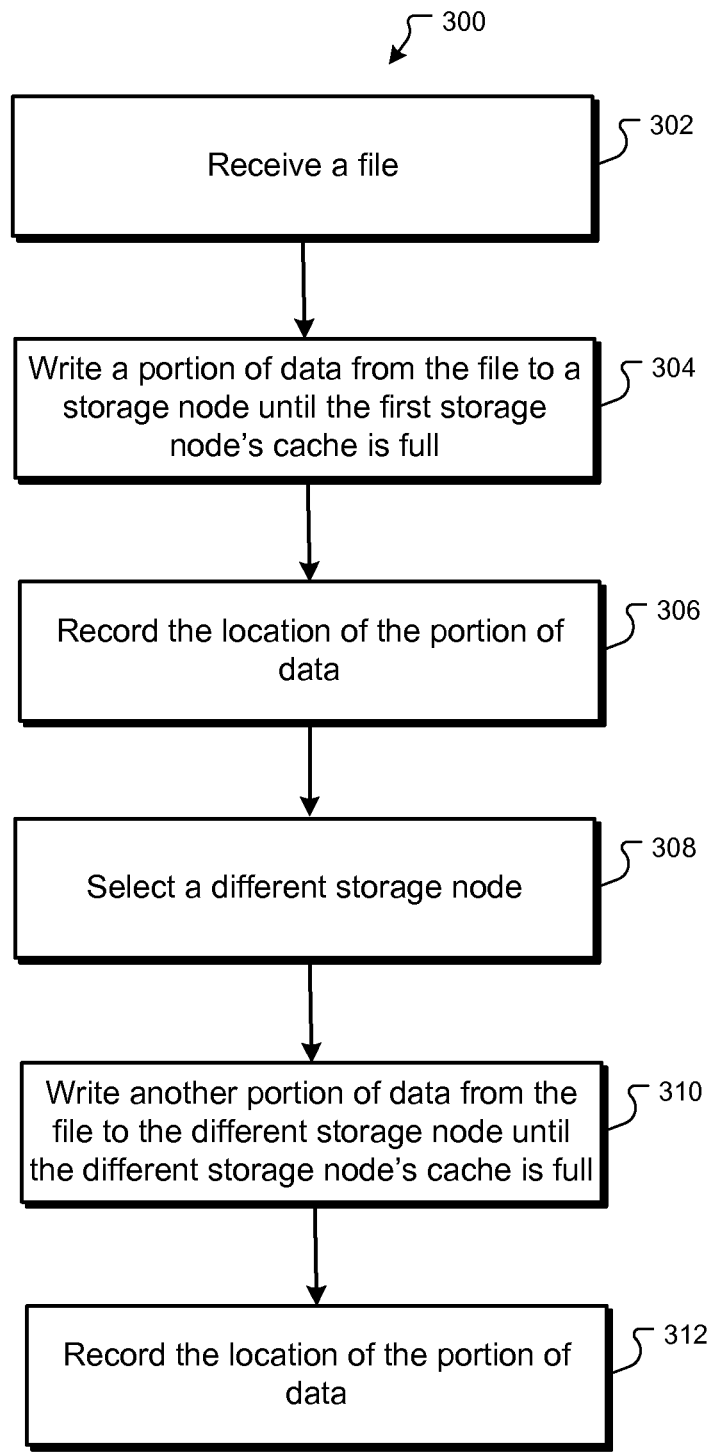
FIG. 3 is a flow diagram of an example technique for storing data on an array of storage nodes each having a cache.

FIG. 3 is a flow diagram of an example technique 300 for storing data on an array of storage nodes each having a cache. The technique 300 can be performed by a computer system, e.g., the computer system 102 of FIG. 1. For purposes of illustration, the technique 300 will be described with respect to a system that performs the technique.

The system receives a file (step 302). The system writes a portion of data from the file to a storage node's cache until determining that the storage node's cache is full (step 304). In some implementations, the storage node copies the portion of data from the storage node's cache to slower storage in response to writing the portion of data to the storage node's cache. After data is copied to slower storage, the cache locations storing that data can be, for example, wiped clean (e.g., zeroed out) or marked as available for writing.

In some implementations, determining that the storage node's cache is full includes determining that a data storage rate has dropped. In some implementations, determining that the storage node's cache is full includes comparing an amount of data to a known size of the storage node's cache and determining that the amount exceeds the known size. The system records a location of the portion of data on the storage node and associates the location with the file (step 306).

The system selects a different storage node in response to determining that the storage node's cache is full (step 308). In some implementations, selecting the different storage node includes selecting the different storage node randomly from the storage nodes. In some implementations, selecting the different storage node includes accessing a log of write times and storage nodes and selecting the storage node having the write time furthest in the past. The system writes another portion of data from the file to the different storage node (step 310). In some implementations, writing another portion of data from the file to the different storage node includes writing the data to the different storage node's cache until determining that the different storage node's cache is full. The system records a location of the data on the different storage node and associates the location with the file (step 312).

Figure 4:
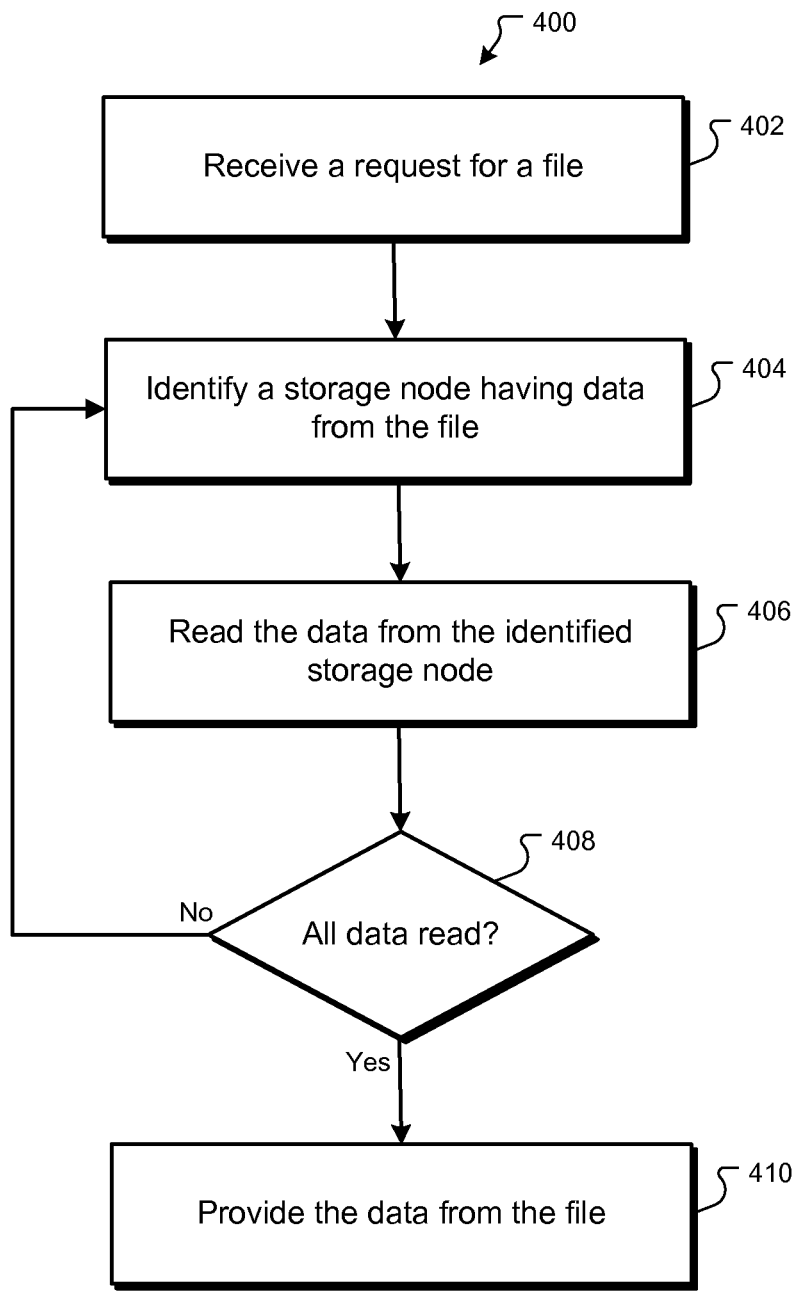
FIG. 4 is a flow diagram of an example technique for reading data from an array of storage nodes each having a cache.

FIG. 4 is a flow diagram of an example technique 400 for reading data from an array of storage nodes each having a cache. The technique 400 can be performed by a computer system, e.g., the computer system 102 of FIG. 1. For purposes of illustration, the technique 400 will be described with respect to a system that performs the technique.

The system receives a request for a file (step 402). For example, the requester can be a client device, e.g., the client device 104 of FIG. 1. The system identifies a storage node having data from the file (step 404). For example, the system can access a storage log having locations of data for various files, e.g., the storage log 116 of FIG. 1. The system reads the data from the identified storage node (step 406). Typically, the system reads the data from the slower storage of the storage node because the storage node has copied data from its cache to its slower storage; however, in some cases, the system can read the data from the cache to improve performance (e.g., where the data was recently written to the cache and has not yet been overwritten or zeroed out).

The system determines whether all the data in the file has been read (step 408). For example, the system can determine whether there are addition entries for the file in a storage log, or compare the amount of data read with a size of the file (e.g., received with the request or stored in a storage log). If all the data for the file has been read, the system provides the data from the file to the requester (step 410). If all the data for the file has not been read, the system identifies another storage node having data from the file (return to step 404).

Figure 5:
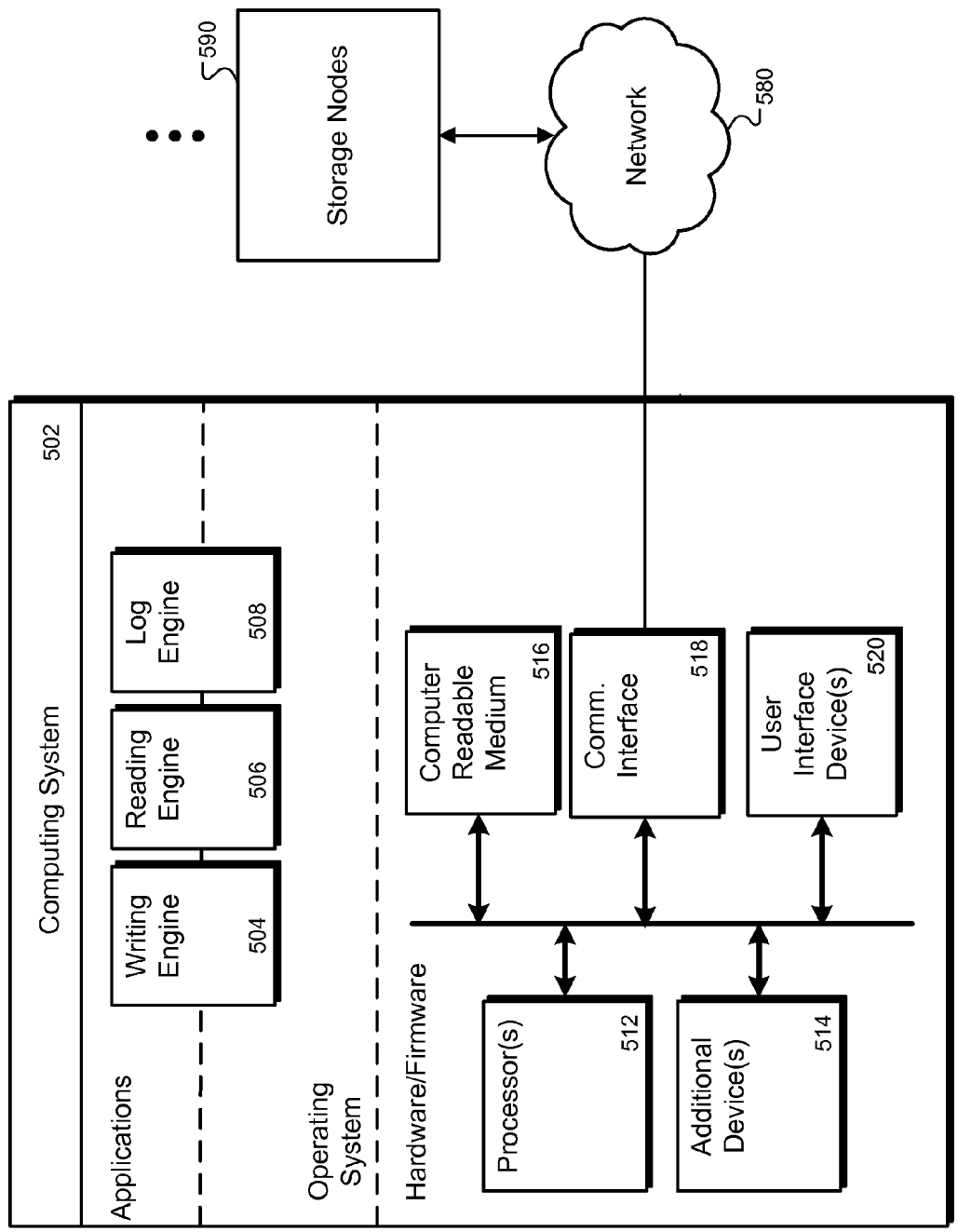
FIG. 5 is a schematic diagram of an example computing system for storing data.

FIG. 5 is a schematic diagram of an example computing system 502 for storing data. In operation, the system 502 communicates with one or more storage nodes 590, directly or through a network 580.

The system 502 includes one or more data processing apparatus. While only one data processing apparatus is shown in FIG. 5, multiple data processing apparatus can be used. The system 502 can be distributed geographically. For example, the system 502 can include multiple data processing apparatus in various geographic locations.

The system 502 includes various modules, e.g., modules of computer program instructions, including a writing engine 504 to write data to the storage nodes (e.g., using the technique 200 of FIG. 2); a reading engine 506 to read data from the storage nodes (e.g., using the technique 400 of FIG. 4); and a log engine to manage a storage log (e.g., the storage log 116 of FIG. 1).

Each module is configured to run on the system 502. For example, a module can run as part of an operating system on the system 502, as an application on the system 502, or as part of the operating system and part of an application on the system 502. Although several software modules are illustrated, the functionality of the server can be implemented in fewer or more software modules. Moreover, the software modules can be distributed on one or more data processing apparatus connected by one or more networks or other suitable communication mediums.

The system 502 also includes hardware or firmware devices including one or more processors 512, one or more additional devices 514, a computer readable medium 516, a communication interface 518, and one or more user interface devices 520. Each processor 512 is capable of executing instructions for execution within the system 502. Each processor 512 is capable of executing instructions stored on the computer readable medium 516 or on a storage device such as one of the additional devices 514. The system 502 uses its communication interface 518 to communicate with one or more computers 590, for example, over a network 580. Examples of user interface devices 520 include a display, a camera, a speaker, a microphone, a tactile feedback device, a keyboard, and a mouse. The system 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by data processing apparatus, the method comprising:
   receiving a file to be stored across a plurality of storage nodes each including a cache;
   storing the file by storing a plurality of portions of the file each on a different storage node, including writing a first portion to a first storage node's cache;
   copying the first portion from the first storage node's cache to slower storage of the first storage node, the slower storage of the first storage node being slower than the first storage node's cache;
   recording, within a log, data specifying the slower storage of the first storage node, the log also specifying a plurality of additional corresponding slower storages of a plurality of storage nodes;
   determining that the first storage node's cache is full and in response, selecting a different second storage node, wherein selecting the second storage node comprises:
      examining the log, and
      selecting the second storage node as the storage node having a corresponding write time in the log that is the furthest in the past of the write times in the log.

2. The method of claim 1, wherein determining that the first storage node's cache is full comprises determining that a data storage rate for writing the first portion has dropped.

3. The method of claim 1, wherein determining that the first storage node's cache is full comprises comparing an amount of the first portion to a known size of the first storage node's cache and determining that the amount is equal to or exceeds the known size.

4. The method of claim 1, further comprising selecting a third storage node in response to determining that the second storage node's cache is full, and assigning a weight to each of the plurality of storage nodes, and wherein selecting the third storage node includes using the weights.

5. The method of claim 4, wherein each storage node's weight is based on a performance characteristic of the storage node.

6. The method of claim 1, further comprising selecting a third storage node in response to determining that the second storage node's cache is full, and wherein selecting the third storage node is based on one or more of: a performance characteristic of the third storage node, usage history of the third storage node, and a past performance record for the third storage node.

7. The method of claim 1, further comprising selecting a third storage node in response to determining that the second storage node's cache is full, and wherein selecting the third storage node is based on an amount of data stored by the third storage node relative to a capacity of the third storage node.

8. The method of claim 1, wherein storing the file comprises writing a second portion to the second storage node.

9. The method of claim 8, wherein writing the second portion to the second storage node comprises writing the second portion to the second storage node's cache until determining that second storage node's cache is full.

10. The method of claim 1, wherein storing the file comprises continuing to write portions of the file to various storage nodes until the file is completely stored in the plurality of storage nodes.

11. The method of claim 1, further comprising:
receiving a request for the file;
reading the first portion from the first storage node; and
reading the second portion from the second storage node.

12. A system comprising one or more data processing apparatus configured to perform operations comprising:
receiving a file to be stored across a plurality of storage nodes each including a cache;
storing the file by storing a plurality of portions of the file each on a different storage node, including writing a first portion to a first storage node's cache;
copying the first portion from the first storage node's cache to slower storage of the first storage node, the slower storage of the first storage node being slower than the first storage node's cache;
recording, within a log, data specifying the slower storage of the first storage node, the log also specifying a plurality of additional corresponding slower storages of a plurality of storage nodes;
determining that the first storage node's cache is full and in response, selecting a different second storage node, wherein selecting the second storage node comprises:
examining the log; and
selecting the second storage node as the storage node having a corresponding write time in the log that is the furthest in the past of the write times in the log.

13. The system of claim 12, wherein determining that the first storage node's cache is full comprises determining that a data storage rate for writing the first portion has dropped.

14. The system of claim 12, wherein determining that the first storage node's cache is full comprises comparing an amount of the first portion to a known size of the first storage node's cache and determining that the amount is equal to or exceeds the known size.

15. The system of claim 12, wherein storing the file comprises writing a second portion to the second storage node.

16. The system of claim 15, wherein writing the second portion to the second storage node comprises writing the second portion to the second storage node's cache until determining that second storage node's cache is full.

17. The system of claim 12, wherein storing the file comprises continuing to write portions of the file to various storage nodes until the file is completely stored in the plurality of storage nodes.

18. The system of claim 12, the operations further comprising:
receiving a request for the file;
reading the first portion from the first storage node; and
reading the second portion from the second storage node.

* * * * *